United States Patent [19]

Harding et al.

[11] Patent Number: 5,568,698

[45] Date of Patent: Oct. 29, 1996

[54] MULTIPURPOSE FISHING TOOL

[76] Inventors: Raymond W. Harding; Kelly M. Harding, both of 901 N. Chaparral, Corpus Christi, Tex. 78401

[21] Appl. No.: 346,000

[22] Filed: Nov. 29, 1994

[51] Int. Cl.⁶ .................................................. A01K 97/00
[52] U.S. Cl. ............................. 43/53.5; 43/17.5; 362/119
[58] Field of Search .................................... 43/17.5, 53.5; 7/106, 125, 164; 81/463, 489; 362/119

[56] References Cited

U.S. PATENT DOCUMENTS

| | | | |
|---|---|---|---|
| 2,597,394 | 5/1952 | Snowden | 43/53.5 X |
| 2,669,055 | 2/1954 | Doerr | 43/53.5 |
| 2,854,564 | 9/1958 | Cohen et al. | 362/119 |
| 3,929,223 | 12/1975 | Ludeman | 43/54.1 X |
| 4,918,775 | 4/1990 | Leu | 7/168 |
| 5,168,629 | 12/1992 | Willard | 7/135 X |

FOREIGN PATENT DOCUMENTS 1241661  6/1967  Germany .................................. 7/106

*Primary Examiner*—J. Elpel
*Attorney, Agent, or Firm*—G. Turner Moller

[57] ABSTRACT

A multipurpose fishing tool resembles a pair of bent long nosed pliers having plier ends for gripping a hook. Handle sections include guards for protecting the fingers of the user. A flashlight carried by one of the handle sections aims at the plier ends to illuminate them. A tape measure receiving recess is provided on one of the handle ends to measure the length of a fish held by an immobilizer located at a site between the free ends of the handle sections.

10 Claims, 1 Drawing Sheet

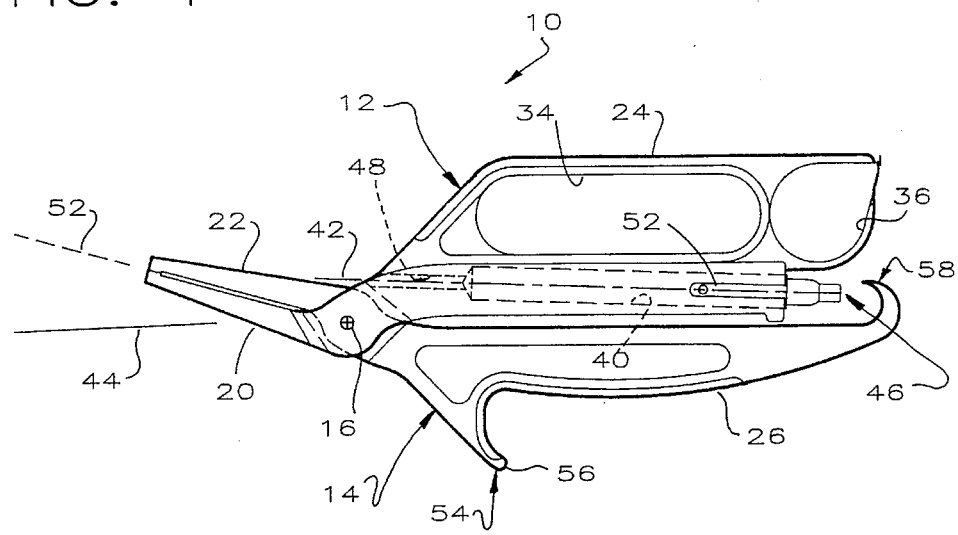
FIG. 1
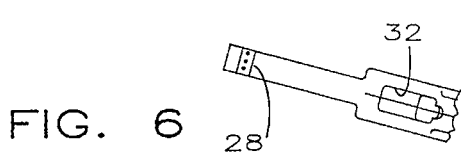
FIG. 3
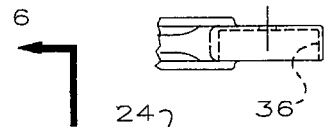
FIG. 4
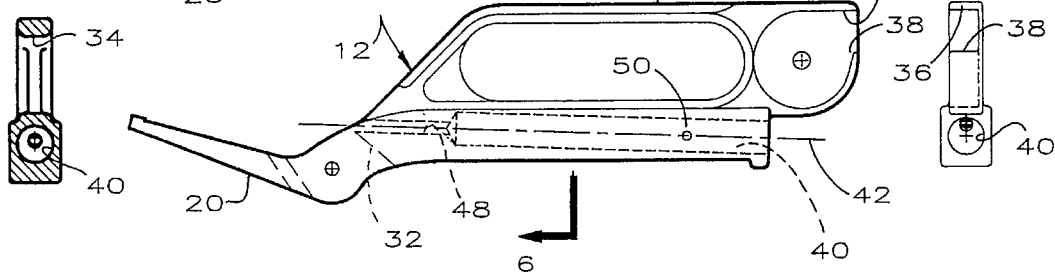
FIG. 2
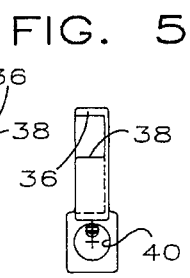
FIG. 5
FIG. 6
FIG. 7
FIG. 9
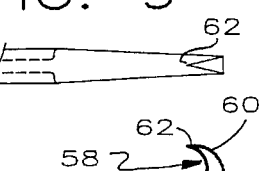
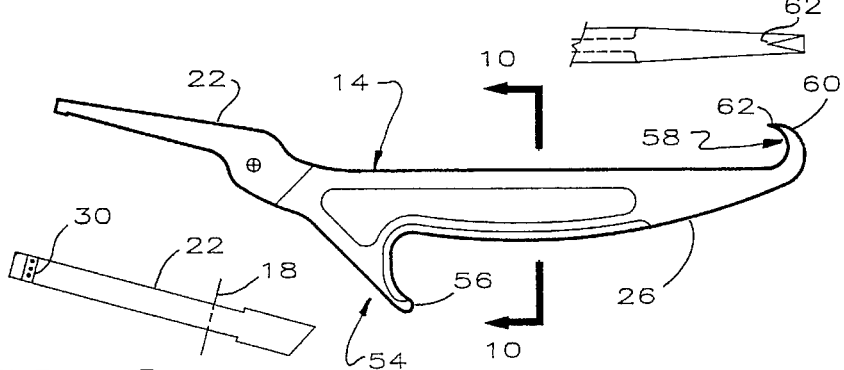
FIG. 10
FIG. 8

MULTIPURPOSE FISHING TOOL

This invention relates to a multipurpose fishing tool and, more particularly, to a tool for removing a hook and measuring the length of a fish.

SUMMARY OF THE INVENTION

The multipurpose tool of this invention resembles a pair of bent, long nosed pliers. The tool is designed so a person can remove a hook from a fish's mouth. A flashlight carried by the tool shines in a direction toward the plier end of the tool. A fish immobilizer, in the shape of a hook, is provided on the free end of one of the handle sections and cooperates with a tape measure in a recess provided adjacent the free end of the other handle section. Hand guards on both of the handle sections protect the user's fingers.

It is an object of this invention to provide a multipurpose fishing tool for removing a hook from a fish and to measure the fish.

BRIEF DESCRIPTION OF THE DRAWING

FIG. 1 is a side elevational view of an assembled multipurpose fishing tool of this invention, illustrating the handle sections in a closed position;

FIG. 2 is a side elevational view of one of the plier members of FIG. 1;

FIG. 3 is a broken edge view of one end of the plier member of FIG. 2;

FIG. 4 is a broken edge view of the opposite end of the plier member of FIG. 2;

FIG. 5 is a bottom view of the plier member of FIG. 2;

FIG. 6 is a cross-sectional view of the plier member of FIG. 2, taken substantially along line 6—6 thereof, as viewed in the direction indicated by the arrows;

FIG. 7 is a side elevational view, analogous to FIG. 2, of the other plier member of FIG. 1;

FIG. 8 is a broken edge view of one end of the plier member of FIG. 7;

FIG. 9 is a broken edge view of the opposite end of the plier member of FIG. 7; and FIG. 10 is a cross-sectional view of the plier member of FIG. 7, taken substantially along line 10—10 thereof, as viewed in the direction indicated by the arrows.

DETAILED DESCRIPTION OF THE INVENTION

Referring to FIG. 1–10, a multipurpose fishing tool 10 of this invention comprises a pair of plier members 12, 14 pivoted intermediate the ends thereof by a pin 16 for pivotal movement about an axis 18. The plier members 12, 14 each comprise a plier end or gripping section 20, 22 and a handle section 24, 26. The plier ends 20, 22 are provided with serrated gripping portions 28, 30 for gripping a hook impaled in a fish's mouth. The plier member 12 includes a slot 32 extending therethrough in a path intersecting the axis 18 for receiving the plier member 14. The pivotal movement of the plier members 12, 14 is accordingly limited by the dimensions of the slot 32.

The handle section 24 provides an elongate opening 34 extending for a substantial distance to receive and protect the fingers of the user. The free end of the handle section 24 provides a recess 36 which opens laterally of the handle section 24 to receive a conventional commercially available tape measure (not shown). The recess 36 includes a slot 38 opening through the bottom of the handle section 24 to pass the measuring tape out of the recess 36.

The handle section 24 also provides a first elongate passage 40 of a first diameter extending along an axis 42 generally parallel to an axis 44 defined by the handle sections 24, 26. The first passage 40 is sized to receive an elongate flashlight 46 directed at a second passage 48 provided by the handle section 24. The second passage 48 is smaller than the first passage 40 and extends along the axis 42 to aim light from the flashlight 46 at the plier ends 20, 22. The handle section 24 includes a dimple 50 to cooperate with a clip 52 on the flashlight 46 to hold the flashlight 46 in place.

As shown in FIG. 1, the gripping sections 20, 22 are inclined along an axis 52 at an acute angle relative to the handle axis 44 so light from the flashlight 46 is directed toward the gripping sections 20, 22.

The plier member 14 includes a thumb guard 54 having a reverted end 56 adjacent the forward end of the handle section 14. The handle section 14 also includes a fish immobilizer 58 at the free end thereof at a location adjacent the free end of the handle section 12 as shown best in FIG. 1. The immobilizer 58 includes a curved outer surface 60 terminating in a pointed end 62. The immobilizer 58 is accordingly of hook shape.

Use of the fishing tool 10 of this invention should now be apparent. To remove a hook from a fish's mouth, the plier ends 20, 22 are inserted into the open mouth of the fish, the flashlight 46 illuminating the plier ends 20, 22 and the adjacent area of the fish. The handle section 24 and the thumb guard 54 protect the user's fingers. If it is desired to measure length of the fish, the fish is held by the immobilizer 56 and the tape (not shown) pulled from the recess 36 to measure it.

We claim:

1. A multipurpose fishing tool comprising
   first and second plier members pivoted intermediate opposite ends thereof providing first and second handle sections having free ends and first and second gripping sections mounted for opening and closing movement in response to movement of the handle sections;
   a flashlight on one of the handle sections aimed at the first and second gripping sections;
   a fish immobilizer rigid with the first handle section adjacent the free end thereof at a location adjacent the free end of the second handle section in a closed position of the handle sections; and
   means, on the free end of one of the handle sections, for receiving a tape measure therein.

2. The multipurpose fishing tool of claim 1 wherein the fish immobilizer is a curved section having one end attached to the first handle section and a free pointed end.

3. The multipurpose fishing tool of claim 2 wherein the fish immobilizer is hook shaped.

4. The multipurpose fishing tool of claim 1 comprising a pin connecting the first and second plier members together for pivotal movement about a first axis and wherein the first and second handle sections provide a second axis perpendicular to the first axis, the first and second gripping sections defining an acute angle relative to the second axis, the flashlight being aimed along a third axis to intersect the gripping sections.

5. The multipurpose fishing tool of claim 4 wherein said one of the handle sections having the tape measure receiving means therein includes an elongate opening therethrough, extending from adjacent the tape measure receiving means toward the pivot pin, sized to receive the fingers of a user and the other handle section includes a thumb guard comprising a curved reverted end.

6. The multipurpose fishing tool of claim 4 wherein one of the plier members includes a slot extending therethrough in a path intersecting the first axis, the other plier member extending through the slot, relative movement of the plier members being limited by the slot.

7. The multipurpose fishing tool of claim 1 wherein one of the handle sections provides an elongate generally straight first passage having a first cross-sectional area, and an elongate generally straight second passage, aligned with and opening into the first passage, having a second cross-sectional area substantially smaller than the first area, the flashlight being received in the first passage and arranged to cast light through the second passage.

8. The multipurpose fishing tool of claim 7 wherein the flashlight includes a clip on one end thereof and the handle section providing the first passage includes a dimple to receive the clip.

9. The multipurpose fishing tool of claim 1 wherein the tape measure receiving means comprises a generally circular recess.

10. The multipurpose fishing tool of claim 9 wherein the generally circular recess is on the second handle section and further provides a slot opening through the free end of the second handle section.

* * * * *